United States Patent
Kurimoto et al.

[19]

[11] Patent Number: 5,929,191
[45] Date of Patent: Jul. 27, 1999

[54] NOVOLAK TYPE PHENOLIC RESINS AND METHODS OF MANUFACTURING THEREOF

[75] Inventors: Yoshiaki Kurimoto; Akiyuki Kojima; Yukio Abe; Tsuyoshi Fukuda; Kaori Hasegawa, all of Gunma-ken, Japan

[73] Assignee: Gun Ei Chemical Industry Co., Ltd., Gunma-ken, Japan

[21] Appl. No.: 08/863,583

[22] Filed: May 27, 1997

Related U.S. Application Data

[62] Division of application No. 08/571,736, Dec. 13, 1995.
[51] Int. Cl.$^6$ ............................................. C08G 8/04
[52] U.S. Cl. ........................ 528/129; 528/137; 528/165; 528/230; 528/425; 528/499
[58] Field of Search ................................ 528/129, 165, 528/230, 425, 499, 137

[56] References Cited

U.S. PATENT DOCUMENTS 5,023,311  6/1991  Kubota ................................. 528/153

FOREIGN PATENT DOCUMENTS 1-105243  4/1989  Japan.
6-41262   2/1994  Japan.

*Primary Examiner*—Duc Truong
*Attorney, Agent, or Firm*—Wenderoth, Lind & Ponac L.L.P.

[57] ABSTRACT

One of the objects of the present invention is to offer novolak type phenolic resins which use phenols and aldehydes as raw materials and give narrow molecular weight distributions.

The novolak type phenolic resins of the present invention are those obtained by condensation reaction of phenols with aldehydes in the presence of an oxycarboxylic acid having carboxyl groups, —COOH, and alcoholic hydroxyl groups, —OH, in one molecule. Thus, obtained novolak type phenolic resins show narrow molecular weight distributions, lower viscosity in molten state and, as a consequence, uniformity in curing time.

12 Claims, 7 Drawing Sheets

NOVOLAK TYPE PHENOLIC RESINS AND METHODS OF MANUFACTURING THEREOF

This is a divisional application of Ser. No. 08/571,736 filed Dec. 13, 1995, now pending.

BACKGROUND OF THE INVENTION

1. Field of the Invention

This invention relates to novolak type phenolic resins offering narrow molecular weight distributions, and methods of manufacturing thereof.

2. Prior Art

Conventionally, novolak type phenolic resins are obtained by making phenols react with aldehydes in the presence of an acidic catalyst, and are used in a wide variety of fields. However, with such conventional novolak type phenolic resins, the molecular weight distributions are wide, which results in such drawbacks as non-uniformity in resin curing time, and high viscosity in molten state.

To eliminate these problems, various methods have conventionally been used. For example, by making phenols react with aldehydes in the presence of an acidic catalyst in an organic solvent system which is composed of a good solvent and a poor one, a novolak resin offering a narrow molecular weight distribution has been obtained. A method of manufacturing of novolak type phenolic resins by making phenols to react with aldehydes in the presence of an acidic catalyst, and then treating the reaction product with a thin film evaporator has been proposed. As disclosed in Patent KOKAI (Laid-Open) No. 1-105243 and Patent KOKAI (Laid-Open) No. 6-41262, a method with which phenols are made to react with aldehydes in the presence of an acidic catalyst, and then the reaction product is washed with water or a mixed solvent of water and a good solvent for fractionation has been proposed.

However, with these methods of manufacturing, the processes are complicated, the yields of resin have been small, and the molecular weight distributions have not always been sufficiently narrow.

SUMMARY OF THE INVENTION

The present invention has been developed in consideration of the above situation, and it intends to offer novolak type phenolic resins having narrow molecular weight distributions which are manufactured from phenols and aldehydes, and to offer methods of manufacturing that allow these novolak type phenolic resins to be obtained at high yields.

The novolak type phenolic resins of the present invention are those obtained by condensation reaction of phenols with aldehydes in the presence of an oxycarboxylic acid having carboxyl groups, —COOH, and alcoholic hydroxyl groups, —OH, in one molecule. Thus, obtained novolak type phenolic resins show narrow molecular weight distributions, lower viscosity in molten state and, as a consequence, uniformity in curing time.

DETAILED DESCRIPTION OF THE INVENTION

Figure 1:
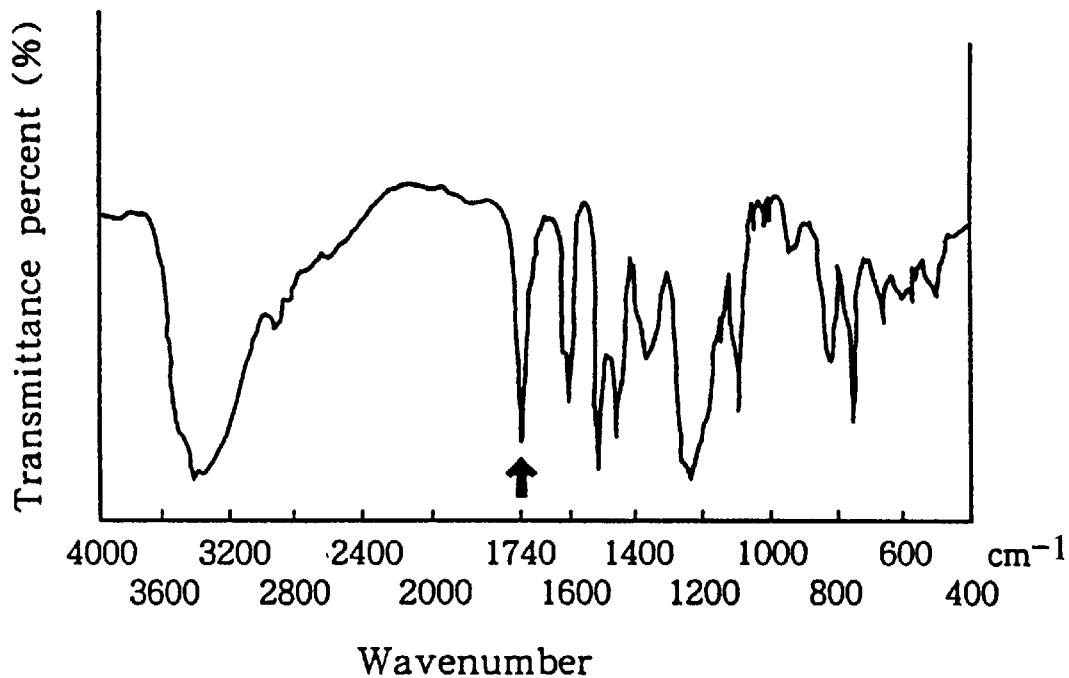
FIG. 1 shows the infrared absorption spectrum revealing the absorption condition due to the carboxylic acid at 1740 $cm^{-1}$ before washing with the preferred embodiment 1.

The novolak type phenolic resins of the invention are those obtained by condensation reaction of phenols with aldehydes in the presence of an oxycarboxylic acid having carboxyl groups, —COOH, and alcoholic hydroxyl groups, —OH, in one molecule.

The novolak type phenolic resins preferably have a ratio of (a)/(b) is 0.05 or higher, where (a) is the number of units, with a carboxyl group, —COOH, and an alcoholic hydroxyl group, —OH, in the said oxycarboxylic acid being considered to form one unit, multiplied by the number of moles of the oxycarboxylic acid, and (b) is the number of aldehyde groups contained in one molecule of the aldehydes multiplied by the number of moles of the aldehydes.

The novolak type phenolic resins are preferably those in which the said oxycarboxylic acid is any one of tartaric acid, citric acid, and malic acid or a mixture of any two or all of these.

The phenols are preferably any one of phenol, cresol, xylenol, bisphenol A, bisphenol F, pyrocatechol, resorcinol, and pyrogallol or a mixture of any two or more of these.

The aldehydes are preferably any one of formaldehyde, paraformaldehyde, trioxane, tetraoxane, benzaldehyde, salicylaldehyde, p-hydroxybenzaldehyde, and terephthalaldehyde or a mixture of any two or more of these.

The ratio of (a)/(b) is preferably 0.1 to 1.0, where (a) is the number of aldehyde groups contained in one molecule of the said aldehydes multiplied by the number of moles of the aldehydes, and (b) is the number of aromatic rings having a hydroxyl group contained in one molecule of the said phenols multiplied by the number of moles of the phenols.

The novolak type phenolic resins can be obtained by using as catalysts the said oxycarboxylic acid in conjunction with any one of hydrochloric acid, sulfuric acid, oxalic acid, and p-toluenesulfonic acid, which are used as an acid catalyst in manufacturing of conventional novolak type phenolic resins.

The method of manufacturing the novolak type phenolic resin is one in which phenols react with aldehydes in the presence of an oxycarboxylic acid catalyst having carboxyl groups, —COOH, and alcoholic hydroxyl groups, —OH, in one molecule.

The novolak type phenolic resin as stated in the claim 9 is that which provides a novolak type phenolic resin by making an oxycarboxylic acid having carboxyl groups, —COOH, and alcoholic hydroxyl groups, —OH, in one molecule react with aldehydes, and then making the reaction product react with phenols.

The novolak type phenolic resin can also be obtained by making phenols react with aldehydes in the presence of an oxycarboxylic acid catalysts having carboxyl groups, —COOH, and alcoholic hydroxyl groups, —OH, in one molecule; after completion of the reaction, washing the reaction mixture with water to remove the catalysts; and then dehydrating and concentrating the resulted mixture.

The a novolak type phenolic resin can also be obtained by making an oxycarboxylic acid having carboxyl groups, —COOH, and alcoholic hydroxyl groups, —OH, in one molecule react with aldehydes, then making the reaction product react with phenols, and after completion of the reaction, washing the reaction mixture with water to remove the catalysts and then dehydrating and concentrating the resulted mixture.

Here is a detailed description of the present invention.

Before completion of the present invention, the inventors of the present invention eagerly and repetitively studied about how to solve the said problems, and found that, by using an oxycarboxylic acid having carboxyl groups, —COOH, and alcoholic hydroxyl groups, —OH, in one molecule, such as any one of tartaric acid, citric acid, and malic acid or a mixture of any two or all of these, as a catalyst for making phenols react with aldehydes, the aldehydes react with the oxycarboxylic acid before they react with the phenols, which results in a novolak type phenolic resin with a narrow molecular weight distribution obtained at a high yield.

With the present invention, the condensation reaction of phenols with aldehydes may be performed by the single-stage process that charges the whole stock including the said oxycarboxylic acid at a time, however, by using the two-stage process, which first makes the oxycarboxylic acid react with the aldehydes, and then charges the phenols for reaction, a novolak type phenolic resin with a still narrower molecular weight distribution can be obtained.

With either of the reaction processes, by washing the reaction mixture with water to remove the catalysts after completion of the reaction, and then dehydrating and concentrating the resulted mixture, a novolak type phenolic resin with a narrower molecular weight distribution can be obtained at a high yield.

Here is a detailed description of the preferred embodiment of the present invention.

The novolak type phenolic resin with the preferred embodiment of the present invention is that obtained by making phenols react with aldehydes with the use of an oxycarboxylic acid having carboxyl groups, —COOH, and alcoholic hydroxyl groups, —OH, in one molecule as a catalyst.

As the said phenols, any one of phenol, cresol, xylenol, bisphenol A, bisphenol F, pyrocatechol, resorcinol, and pyrogallol or a mixture of any two or more of these is used.

As the said aldehydes, any one of formaldehyde, paraformaldehyde, trioxane, tetraoxane, benzaldehyde, salicylaldehyde, p-hydroxybenzaldehyde, and terephthalaldehyde or a mixture of any two or more of these is used.

As the oxycarboxylic acid catalysts, any one of tartaric acid, citric acid, and malic acid or a mixture of any two or all of these is used, and in conjunction with it, any one of hydrochloric acid, sulfuric acid, oxalic acid, and p-toluenesulfonic acid, which are used as a catalyst for manufacturing of conventional novolak type phenolic resins, can be used.

The reaction mole ratio of the said phenols the said aldehydes, i.e., (a)/(b), where (a) is the number of aldehyde groups contained in one molecule of the aldehydes multiplied by the number of moles of the aldehydes, and (b) is the number of aromatic rings having a hydroxyl group contained in one molecule of the phenols multiplied by the number of moles of the phenols, is generally 0.1 to 1.0, preferably, 0.5 to 0.9. If the ratio of (a)/(b) is lower than 0.1, the concentration of free phenols in the resulted novolak type phenolic resin becomes large, while the (a)/(b) ratio higher than 1.0 will give too wide molecular weight distribution to the resulted resin.

With the said oxycarboxylic acid as a catalyst, the ratio of (a)/(b) is generally 0.05 or higher, preferably 0.25 or higher, where (a) is the number of units, with a carboxyl group, —COOH, and an alcoholic hydroxyl group, —OH, in the oxycarboxylic acid being considered to form one unit, multiplied by the number of moles of the oxycarboxylic acid, and (b) is the number of aldehyde groups contained in one molecule of the aldehydes multiplied by the number of moles of the aldehydes. If the ratio of (a)/(b) is lower than 0.05, the molecular weight distribution will be brought to near that which would be given if an acid that is used as a catalyst for manufacturing of a conventional novolak type phenolic resin was used. The higher the ratio of (a)/(b), the narrower the molecular weight distribution for the novolak type phenolic resin obtained will be.

With the preferred embodiment of the present invention, the condensation reaction of phenols with aldehydes may be performed by the single-stage process that charges the whole stock including the said oxycarboxylic acids at a time, however, by using the two-stage process, which first makes the oxycarboxylic acid to react with the aldehydes, and then charges the phenols for reaction, the molecular weight distribution will be still narrower.

After completion of the reaction, the reaction mixture is washed with water to remove the catalysts. Then by dehydrating and concentrating the resulted mixture, a novolak type phenolic resin with a narrower molecular weight distribution is obtained.

Here is a detailed description of the particular preferred embodiments of the present invention, however, the present invention is not limited to these preferred embodiments.
Preferred embodiment 1

141 g of phenol, 41.9 g of 86% paraformaldehyde, and 180 g of tartaric acid were placed in a 500-ml four-necked separable flask equipped with a thermometer, a stirrer, and a reflux condenser, and heated to 120° C., and the reaction was continued under reflux for 4 hours. After completion of the reaction, 141 g of pure water was added, and after stirring for 30 min., the aqueous layer being separated from the resin was removed.

Figure 2:
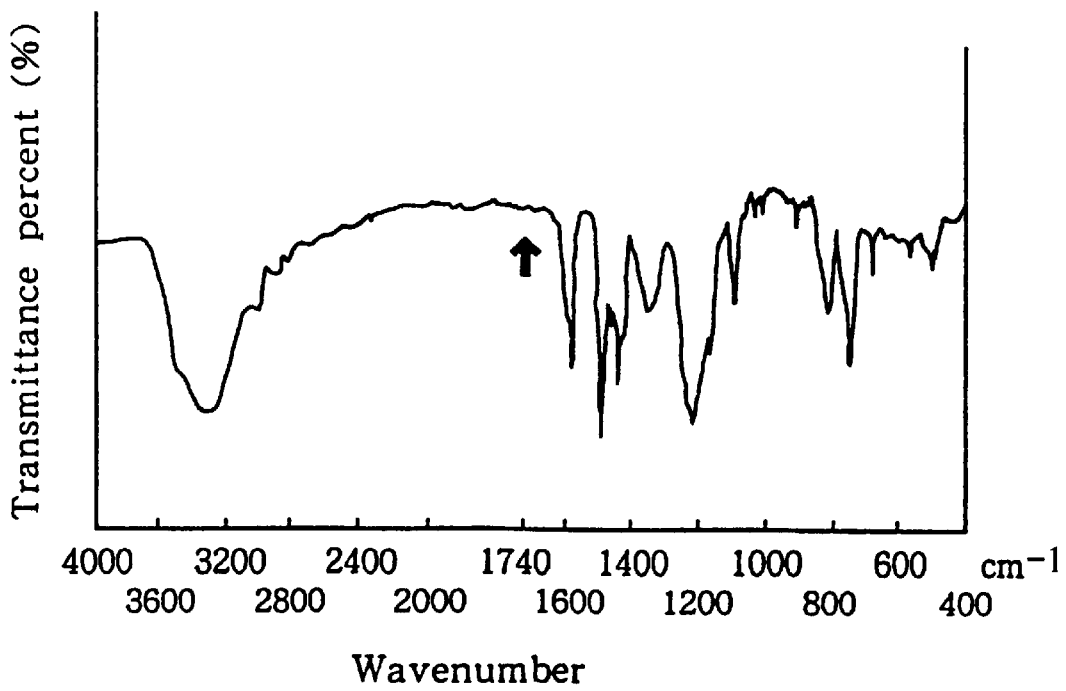
FIG. 2 shows the infrared absorption spectrum revealing the absorption condition due to the carboxylic acid at 1740 $cm^{-1}$ after washing with the preferred embodiment 1.

The washing process, i.e., the procedure between water adding and aqueous layer removal were repeated until most of the catalyst was removed. The catalyst removal was identified by using the absorption due to the carboxylic acid at 1740 cm$^{-1}$, as shown in FIGS. 1 and 2, as the index. FIG. 1 shows the infrared absorption spectrum revealing the absorption condition due to the carboxylic acid at 1740 cm$^{-1}$ before washing with the preferred embodiment 1, while FIG. 2 shows the infrared absorption spectrum revealing the absorption condition due to the carboxylic acid at 1740 cm$^{-1}$ after washing with the preferred embodiment 1.

Figure 3:
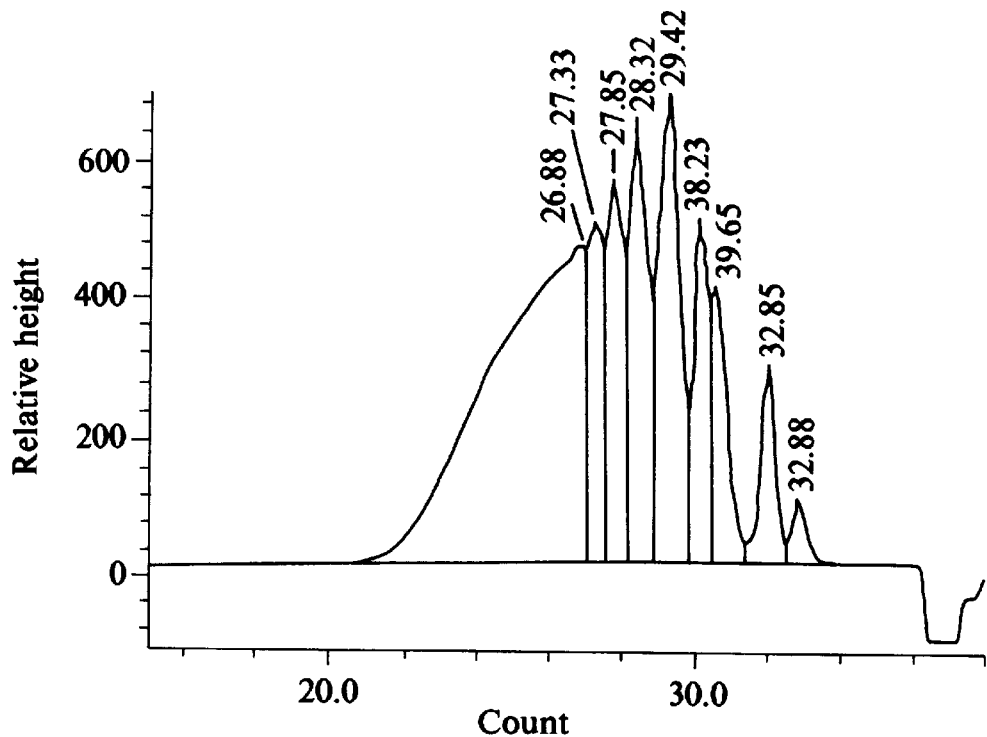
FIG. 3 shows the result of determination by gel permeation chromatography for the resin provided by the preferred embodiment 1.

After washing, the resulted mixture was dehydrated and concentrated to obtain 151 g of a light-yellow, clear novolak type phenolic resin. FIG. 3 shows the result of determination by gel permeation chromatography for the resin provided by the preferred embodiment 1.

FIG. 1, which shows the infrared absorption spectrum revealing the absorption condition due to the carboxylic acid at 1740 cm$^{-1}$ before washing, permits the presence of the tartaric acid to be identified. Also, FIG. 2, which shows the infrared absorption spectrum revealing the absorption condition due to the carboxylic acid at 1740 cm$^{-1}$ after washing, permits the removal of the tartaric acid to be identified.

Preferred embodiment 2

Figure 4:
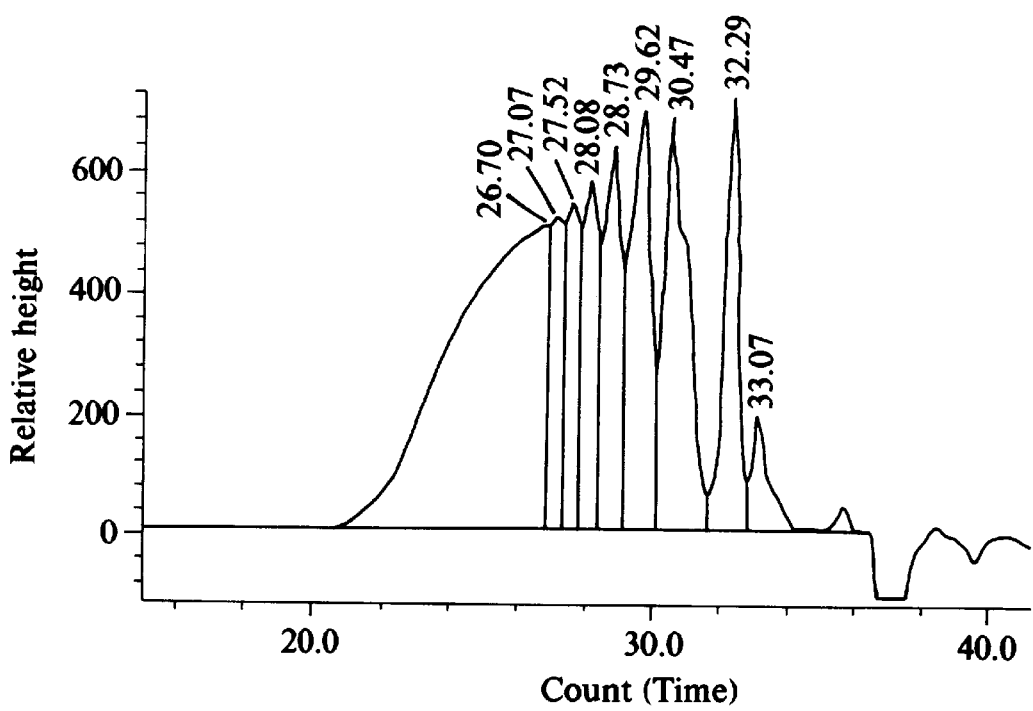
FIG. 4 shows the result of determination by gel permeation chromatography for the resin provided by the preferred embodiment 2.

By tracing the same precedures as those in the above preferred embodiment 1 except that the 180 g of tartaric acid used in the preferred embodiment 1 was changed to 45 g, 147 g of a light-yellow, clear novolak type phenolic resin was obtained. FIG. 4 shows the result of determination by gel permeation chromatography for the resin provided by the preferred embodiment 2.

Preferred embodiment 3

41.9 g of 86% paraformaldehyde, and 180 g of tartaric acid were placed in the same apparatus as that used in the above preferred embodiment 1, and heated to 120° C., and the reaction was continued under reflux for 2 hours.

Figure 5:
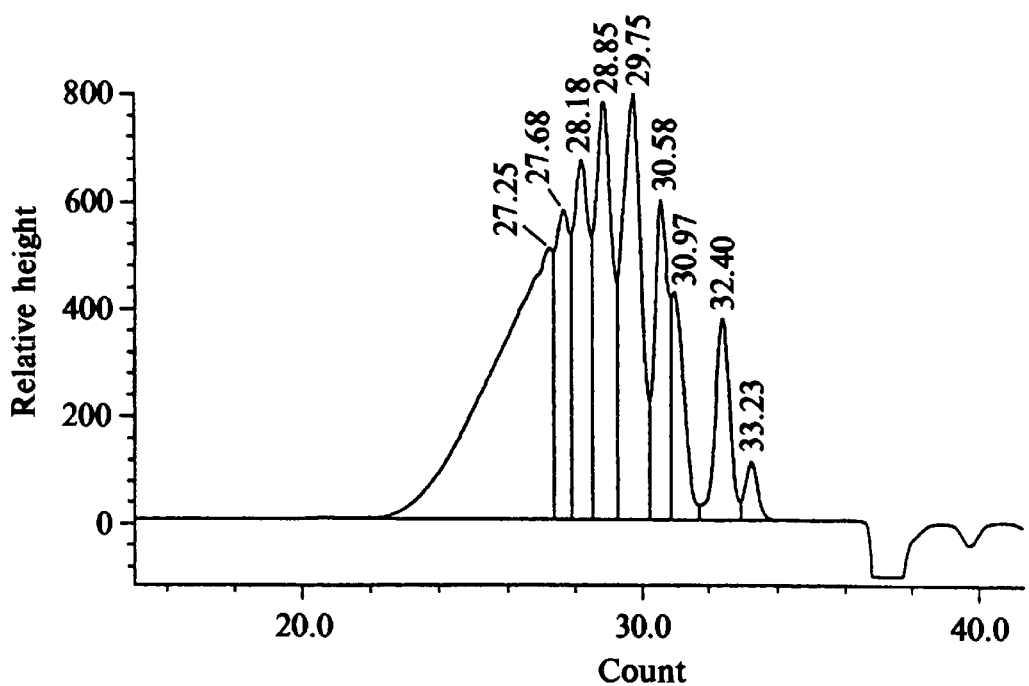
FIG. 5 shows the result of determination by gel permeation chromatography for the resin provided by the preferred embodiment 3.

After completion of the reaction, the contents were cooled to below 40° C., 141 g of phenol was added and heated to 120° C., and the reaction was continued under reflux for 4 hours. After completion of the reaction, 141 g of pure water was added, and after stirring for 30 min., the aqueous layer being separated from the resin was removed. The washing process, i.e., the procedures between water adding and aqueous layer removal were repeated until most of the catalyst was removed. After washing, the resuted mixture was dehydrated and concentrated to obtain 152 g of a light-yellow, clear novolak type phenolic resin. FIG. 5 shows the result of determination by gel permeation chromatography for the resin provided by the preferred embodiment 3.

Preferred embodiment 4

Figure 6:
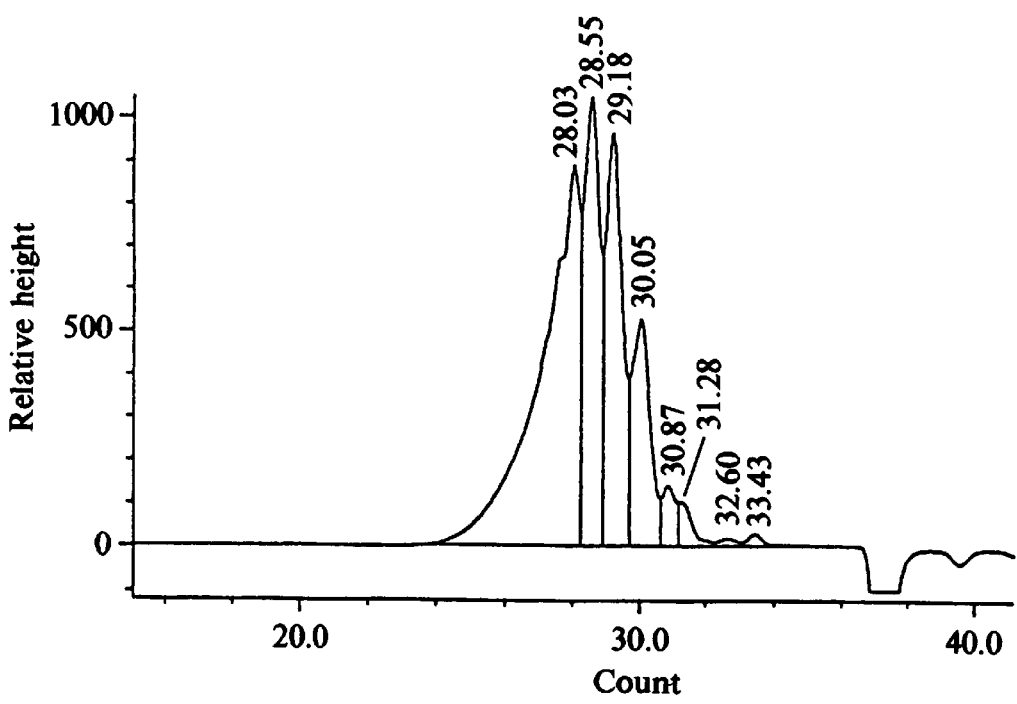
FIG. 6 shows the result of determination by gel permeation chromatography for the resin provided by the preferred embodiment 4.

By tracing the same procedures as those in the above preferred embodiment 3 except that the 180 g of tartaric acid used in the above preferred embodiment 3 was changed to 1800 g, the internal volume of the reaction vessel was changed to 3000 ml, and the quantity of water for the first washing was changed to 1000 g, 154 g of a light-yellow, clear novolak type phenolic resin was obtained. FIG. 6 shows the result of determination by gel permeation chromatography for the resin provided by the preferred embodiment 4.

Preferred embodiment 5

Figure 7:
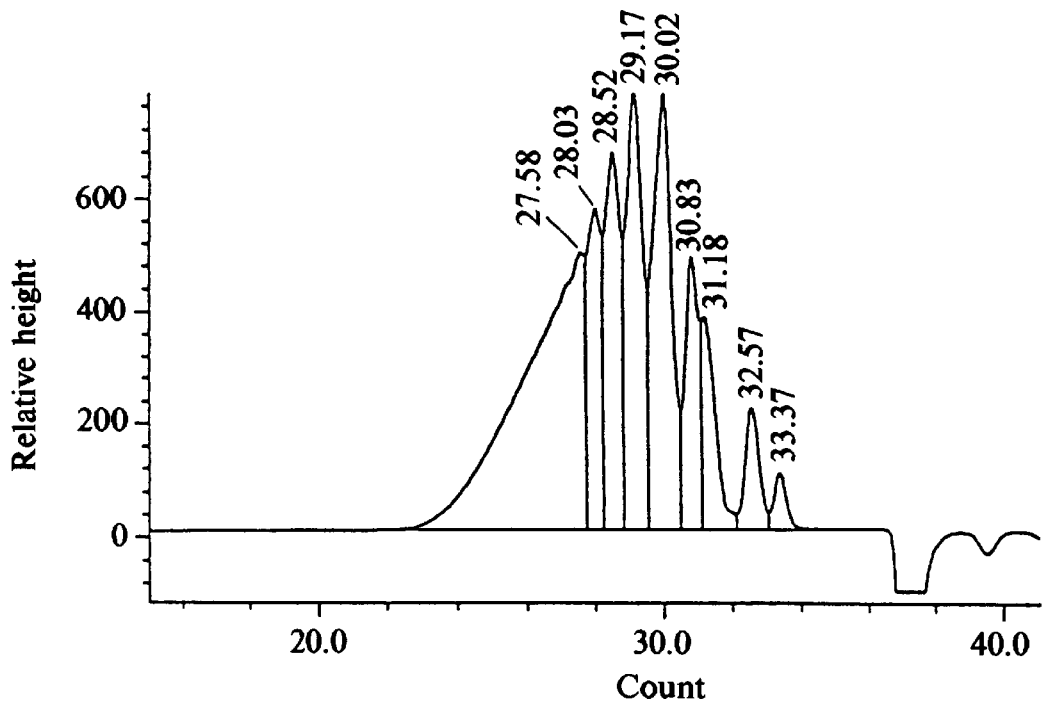
FIG. 7 shows the result of determination by gel permeation chromatography for the resin provided by the preferred embodiment 5.

By tracing the same procedures as those in the above preferred embodiment 3 except that the 41.9 g of 86% paraformaldehyde used in the preferred embodiment 3 was changed to 36 g of trioxane, 152 g of a light-yellow, clear novolak type phenolic resin was obtained. FIG. 7 shows the result of determination by gel permeation chromatography for the resin provided by the preferred embodiment 5.

Preferred embodiment 6

Figure 8:
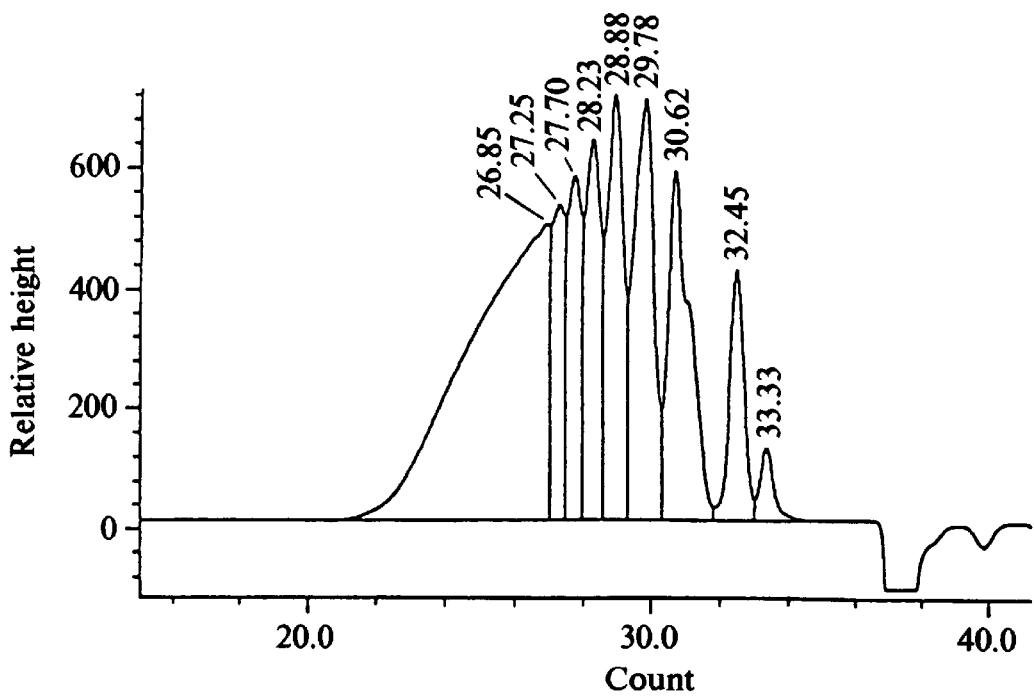
FIG. 8 shows the result of determination by gel permeation chromatography for the resin provided by the preferred embodiment 6.

By tracing the same procedures as those in the above preferred embodiment 3 except that the 41.9 g of 86% paraformaldehyde used in the preferred embodiment 3 was changed to 97.3 g of 37% formalin, 147 g of a light-yellow, clear novolak type phenolic resin was obtained. FIG. 8 shows the result of determination by gel permeation chromatography for the resin provided by the preferred embodiment 6.

Preferred embodiment 7

41.9 g of 86% paraformaldehyde, and 230.4 g of citric acid were placed in the same apparatus as that used in the above preferred embodiment 1, and heated to 120° C., and the reaction was continued under reflux for 2 hours. After completion of the reaction, the contents were cooled to below 40° C. and taken out, and 272.3 g of a solid reaction product was obtained.

Then, 141 g of phenol was placed in the same apparatus as that used in the above preferred embodiment 1, heated to 60° C., and kept at 60° C., while 272.3 g of the solid reaction product from the paraformaldehyde and citric acid was gradually added to be dissolved. After completion of the dissolution, the contents were heated to 120° C., and the reaction was continued under reflux for 4 hours. After completion of the reaction, 141 g of pure water was added, and after stirring for 30 min., the aqueous layer being separated from the resin was removed. The washing process, i.e., the procedures between water adding and aqueous layer removal were repeated until most of the catalyst was removed.

Figure 9:
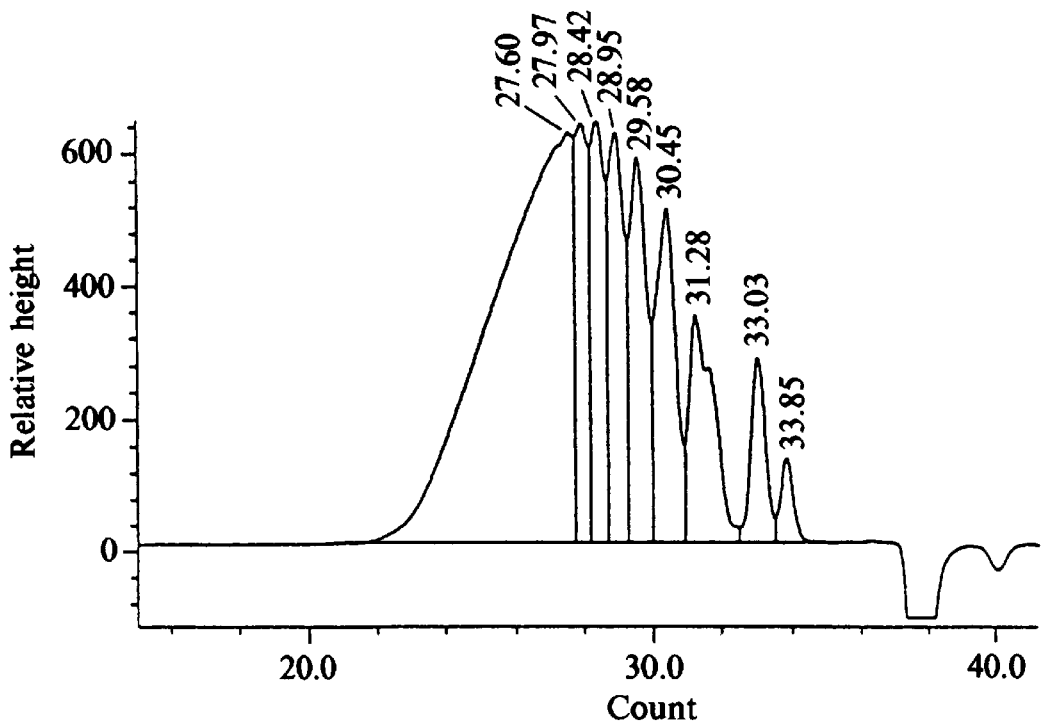
FIG. 9 shows the result of determination by gel permeation chromatography for the resin provided by the preferred embodiment 7.

After completion of the washing, the resulted mixture was dehydrated and concentrated to obtain 141 g of a light-yellow, clear novolak type phenolic resin. FIG. 9 shows the result of determination by gel permeation chromatography for the resin provided by the preferred embodiment 7.

Preferred embodiment 8

Figure 10:
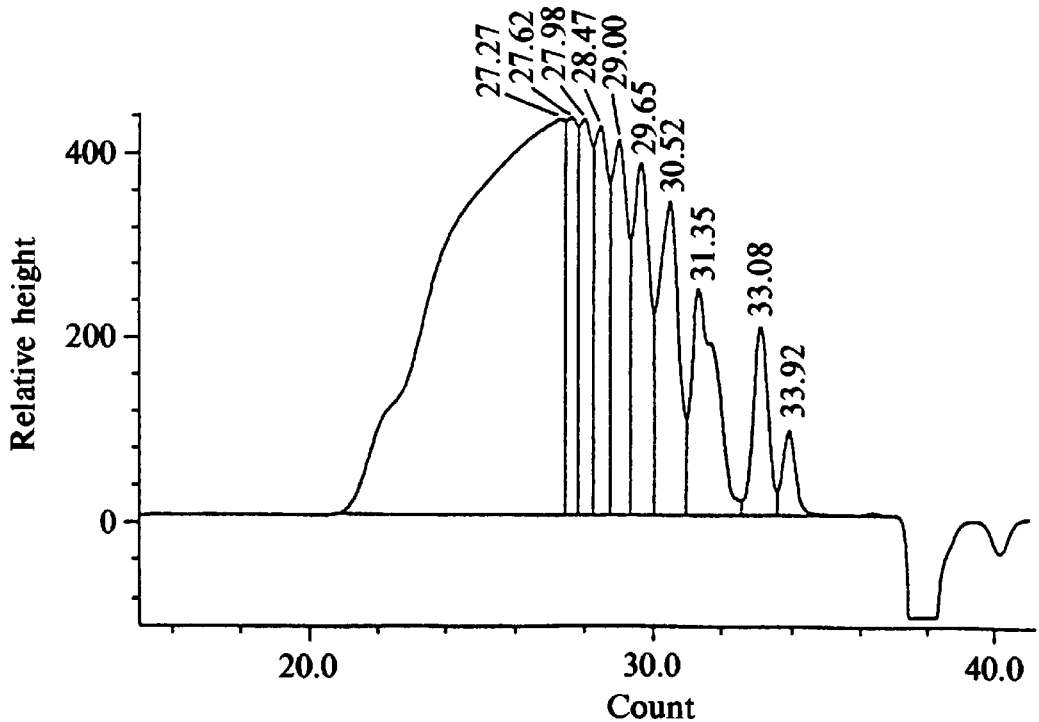
FIG. 10 shows the result of determination by gel permeation chromatography for the resin provided by the preferred embodiment 8.

By tracing the same procedures as those in the above preferred embodiment 3 except that the 180 g of tartaric acid used in the preferred embodiment 3 was changed to 161 g of malic acid, 147 g of a light-yellow, clear novolak type phenolic resin was obtained. FIG. 10 shows the result of determination by gel permeation chromatography for the resin provided by the preferred embodiment 8.

Preferred embodiment 9

Figure 11:
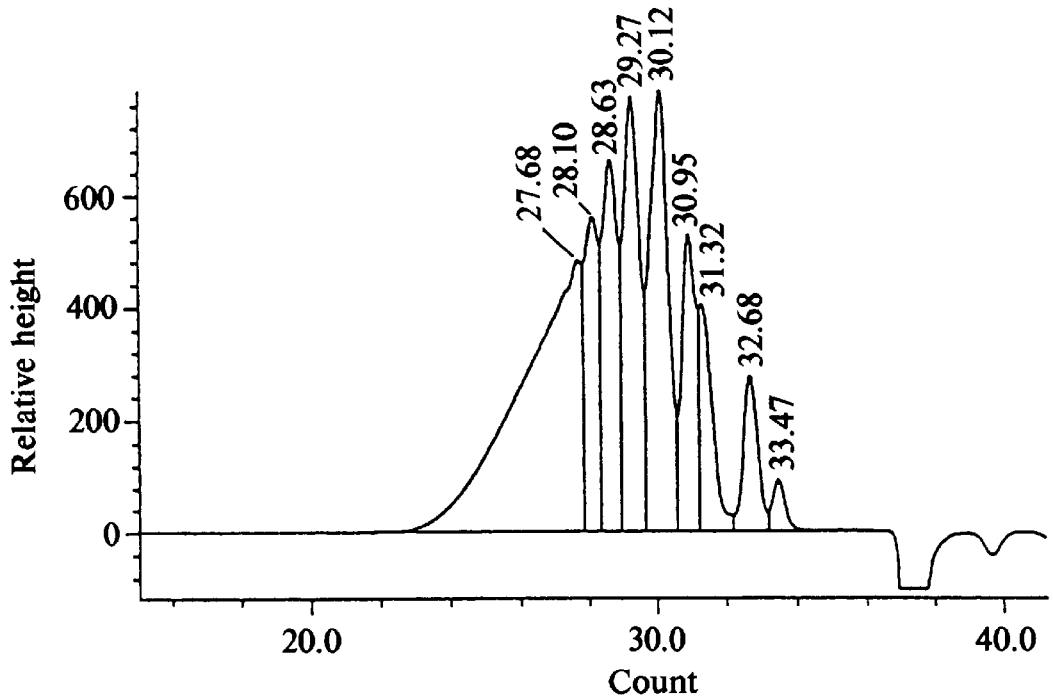
FIG. 11 shows the result of determination by gel permeation chromatography for the resin provided by the preferred embodiment 9.

By tracing the same procedures as those in the above preferred embodiment 3 except that the 180 g of tartaric acid used in the preferred embodiment 3 was changed to 180 g of tartaric acid used in conjunction with 1.41 g of oxalic acid, 152 g of a light-yellow, clear novolak type phenolic resin was obtained. FIG. 11 shows the result of determination by gel permeation chromatography for the resin provided by the preferred embodiment 9.

Preferred embodiment 10

Figure 12:
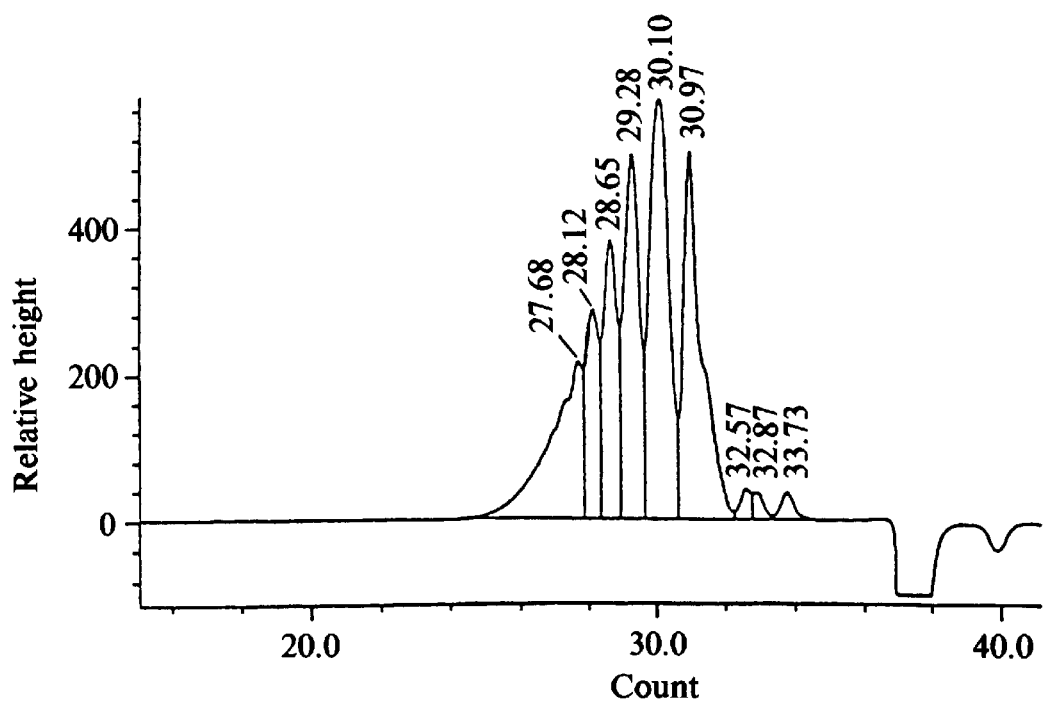
FIG. 12 shows the result of determination by gel permeation chromatography for the resin provided by the preferred embodiment 10.

By tracing the same procedures as those in the above preferred embodiment 3 except that the 141 g of phenol used in the preferred embodiment 3 was changed to 162 g of orthocresol, and the quantity of water used for the washing process was changed to 162 g, 176 g of a light-yellow, clear novolak type phenolic resin was obtained. FIG. 12 shows the result of determination by gel permeation chromatography for the resin provided by the preferred embodiment 10.

Comparison example 1

Figure 13:
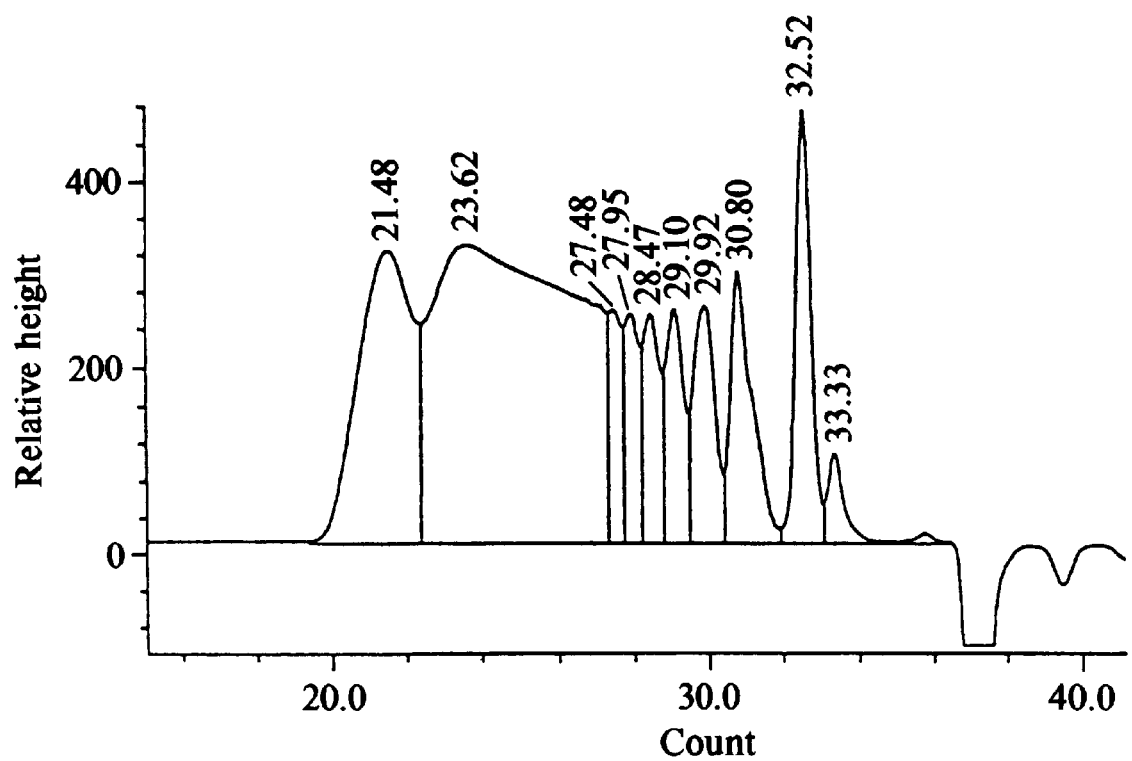
FIG. 13 shows the result of determination by gel permeation chromatography for the resin provided by the comparison example 1.

141 g of phenol, 97.3 g of 37% formalin, and 0.99 g of oxalic acid were placed in the same apparatus as that used in the above preferred embodiment 1, and heated to 100° C., and the reaction was continued under reflux for 4 hours. After completion of the reaction, the reaction mixture was dehydrated and concentrated to obtain 138 g of a light-yellow, clear novolak type phenolic resin. FIG. 13 shows the result of determination by gel permeation chromatography for the resin provided by the comparison example 1.

Table 1 gives the results of determination of the softening point and molecular weight distribution, and the yield for each of the resins provided by the above preferred embodiments 1 to 10, and the comparison example 1.

The said molecular weight distribution was determined by gel permeation chromatography, and as a measure of the breadth of the molecular weight distribution, the ratio of weight-average molecular weight (Mw) to number-average molecular weight (Mn) by polystyrene conversion was used.

TABLE 1

|  | Preferred embodiment 1 | Preferred embodiment 2 | Preferred embodiment 3 | Preferred embodiment 4 | Preferred embodiment 5 | Preferred embodiment 6 | Preferred embodiment 7 | Preferred embodiment 8 | Preferred embodiment 9 | Preferred embodiment 10 | Comparison example 1 |
|---|---|---|---|---|---|---|---|---|---|---|---|
| Phenols | Phenol | Phenol | Phenol | Phenol | Phenol | Phenol | Phenol | Phenol | Phenol | o-cresol | Phenol |
| Aldehydes | 86% (F)n | 86% (F)n | 86% (F)n | 86% (F)n | Trioxane | 37% formalin | 86% (F)n | 86% (F)n | 86% (F)n | 86% (F)n | 37% formalin |
| (a)/(b) ratio | 0.8 | 0.8 | 0.8 | 0.8 | 0.8 | 0.8 | 0.8 | 0.8 | 0.8 | 0.8 | 0.8 |
| Catalyst species | Tartaric acid | Tartaric acid | Tartaric acid | Tartaric acid | Tartaric acid | Tartaric acid | Citric acid | Malic acid | Tartaric acid and oxalic acid | Tartaric acid | Oxalic acid |
| (a)/(b) ratio | 2 | 0.5 | 2 | 20 | 2 | 2 | 1 | 1 | 2 | 2 | — |
| Softening point (° C.) | 97 | 91 | 90 | 103 | 95 | 95 | 107 | 114 | 95 | 89 | 112 |
| $M_W/M_N$ | 1.29 | 1.68 | 1.24 | 1.07 | 1.18 | 1.40 | 1.31 | 1.88 | 1.17 | 1.05 | 5.51 |
| Yield (wt %/phenols) | 107 | 104 | 108 | 109 | 108 | 104 | 100 | 103 | 108 | 109 | 98 |
| Number of washing times | 4 | 4 | 4 | 5 | 4 | 4 | 4 | 4 | 4 | 4 | 0 |
| Reaction formulation | Single-stage reaction | Single-stage reaction | Two-stage reaction | Two-stage reaction | Two-stage reaction | Two-stage reaction | Two-stage reaction | Two-stage reaction | Two-stage reaction | Two-stage reaction | Conventional reaction |

As can be seen from Table 1, each of the resins provided by the above preferred embodiments 1 to 10 gives a small value of Mw/Mn, which is a measure of the breadth of the molecular weight distribution, when compared to the resin provided by the comparison example 1, and thus offers a narrow molecular weight distribution.

As can be seen from each of FIGS. 3 to 13, which show the results of determination by gel permeation chromatography for the resins provided by the above preferred embodiments 1 to 10 and the comparison example 1, the molecular weight distributions for the preferred embodiments 1 to 10 as shown in FIGS. 3 to 12 are narrow, compared to the molecular weight distribution for the comparison example 1 as shown in FIG. 13.

With the present invention as described above in detail, novolak type phenolic resins can be provided which offer narrow molecular weight distributions, and lower viscosity in molten state and, as a consequence uniformity in curing time.

In addition, with this invention, the methods of manufacturing allow the above stated novolak type phenolic resins to be provided by simple processes at high yields.

What is claimed is:

1. A method for manufacturing a novolak type phenolic resin, which comprises reacting a phenol with an aldehyde in the presence of a catalyst consisting of at least one member selected from the group consisting of tartaric acid and citric acid.

2. The method according to claim 1, wherein a ratio (a)/(b) is 0.05 or higher, where (a) is the number of units consisting of a carboxyl group and a hydroxyl group in one molecule of said catalyst multiplied by the number of moles of said catalyst, and (b) is the number of aldehyde groups contained in one molecule of said aldehyde multiplied by the number of moles of said aldehyde.

3. The method according to claim 1, wherein a ratio (a)/(b) is 0.25 or higher, where (a) is the number of units consisting of a carboxyl group and a hydroxyl group in one molecule of said catalyst multiplied by the number of moles of said catalyst, and (b) is the number of aldehyde groups contained in one molecule of said aldehyde multiplied by the number of moles of said aldehyde.

4. The method according to claim 1, wherein said phenol is selected from the group consisting of phenol, cresol, xylenol, bisphenol A, bisphenol F, pyrocatechol, resorcinol, pyrogallol and a mixture of any two or more of these.

5. The method according to claim 1, wherein the aldehyde is selected from the group consisting of formaldehyde, paraformaldehyde, trioxane, tetraoxane, benzaldehyde, salicylaldehyde, p-hydroxybenzaldehyde, terephthalaldehyde and a mixture of any two or more of these.

6. The method according to claim 1, wherein a ratio (a)/(b) is 0.1–1.0, where (a) is the number of aldehyde groups contained in one molecule of said aldehyde multiplied by the number of moles of said aldehyde, and (b) is the number of aromatic rings having a hydroxyl group contained in one molecule of said phenol multiplied by the number of moles of said phenol.

7. A method for manufacturing a novolak type phenolic resin, which comprises the steps of:
    reacting a phenol with an aldehyde in the presence of a catalyst consisting of at least one member selected from the group consisting of tartaric acid and citric acid;
    washing the resultant reaction mixture with water to remove said catalyst; and
    dehydrating and concentrating the resultant mixture.

8. The method according to claim 7, wherein a ratio (a)/(b) is 0.05 or higher, where (a) is the number of units consisting of a carboxyl group and a hydroxyl group in one molecule of said catalyst multiplied by the number of moles of said catalyst, and (b) is the number of aldehyde groups contained in one molecule of said aldehyde multiplied by the number of moles of said aldehyde.

9. The method according to claim 7, wherein a ratio (a)/(b) is 0.25 or higher, where (a) is the number of units consisting of a carboxyl group and a hydroxyl group in one molecule of said catalyst multiplied by the number of moles of said catalyst, and (b) is the number of aldehyde groups contained in one molecule of said aldehyde multiplied by the number of moles of said aldehyde.

10. The method according to claim 7, wherein said phenol is selected from the group consisting of phenol, cresol, xylenol, bisphenol A, bisphenol F, pyrocatechol, resorcinol, pyrogallol and a mixture of any two or more of these.

11. The method according to claim 7, wherein the aldehyde is selected from the group consisting of formaldehyde, paraformaldehyde, trioxane, tetraoxane, benzaldehyde, salicylaldehyde, p-hydroxybenzaldehyde, terephthalaldehyde and a mixture of any two or more of these.

12. The method according to claim 7, wherein a ratio (a)/(b) is 0.1–1.0, where (a) is the number of aldehyde groups contained in one molecule of said aldehyde multiplied by the number of moles of said aldehyde, and (b) is the number of aromatic rings having a hydroxyl group contained in one molecule of said phenol multiplied by the number of moles of said phenol.

* * * * *